(No Model.)
A. F. HALL.
TOP PROP FOR CARRIAGES.
No. 261,601. Patented July 25, 1882.
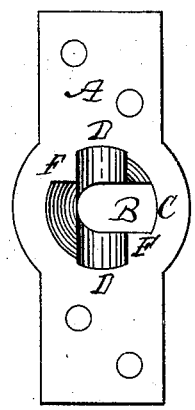
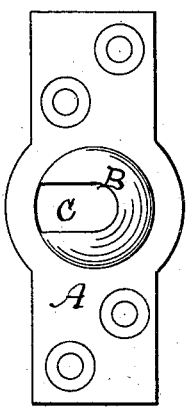
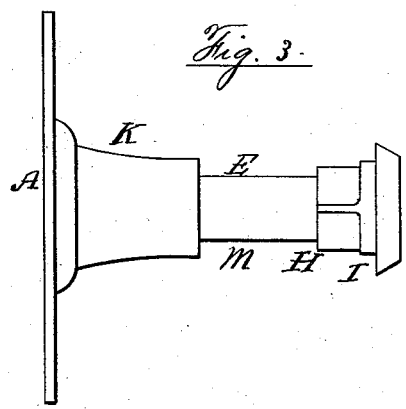
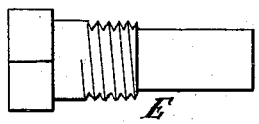
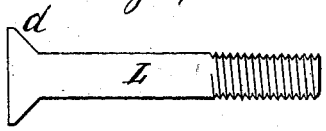
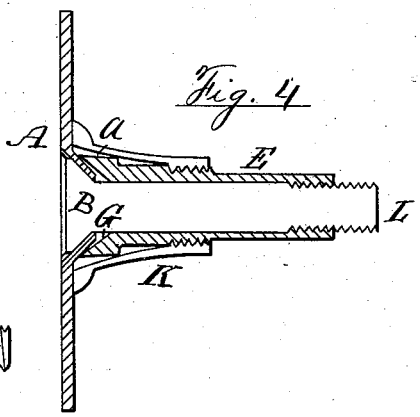
Attest:
F. P. Steadman
W. E. Bradner
Inventor.
Albert F. Hall
By Israel Harris
Atty

UNITED STATES PATENT OFFICE.

ALBERT F. HALL, OF NEWARK, NEW JERSEY.

TOP-PROP FOR CARRIAGES.

SPECIFICATION forming part of Letters Patent No. 261,601, dated July 25, 1882.

Application filed December 7, 1881. (No model.)

*To all whom it may concern:*

Be it known that I, ALBERT F. HALL, residing in Newark, in the county of Essex and State of New Jersey, have invented certain new and useful Improvements in Carriage-Top Props, fully described and represented in the following specification and the accompanying drawings, forming a part of the same.

My invention relates to props for carriages wherein the bolt is connected with the plate without the aid of a screw-thread in the plate or on the end of the bolt which enters the plate, with the assistance of a sleeve-nut; and it consists in the devices as herein set forth.

Figure 1 is a plan view of the plate. Fig. 2 is an inverted view of the same. Fig. 3 is an outside view of the prop. Fig. 4 is a sectional view of the same. Figs. 5, 6, 7 are detailed views.

In my construction I make the plate A provided with a recess, B, with an opening, C, on one side, whereby the head of the bolt or post L is allowed to slide into position in the recess, two sides of the bolt-head being flattened (see Fig. 6) for the purpose, and then turned quarter round, so that the flange ends *a* of the bolt-head will catch under the plate in the recess B and into recesses D, which prevent the post from turning around or getting loose in use, as the sleeve-nut E will draw the head up into these recesses D. There are also in the recess B the stops F, which prevent the post from turning more than quarter around when it is being adjusted in position.

The sleeve-nut E is screwed onto the post, thereby tightening it in the recesses, as above stated.

The lower end of the sleeve has a beveled recess, G, fitting a similar convex shape of the upper side of the recess B of the plate, thereby making a better connection between the sleeve and plate.

The end H forms a shoulder for the prop-nut I to screw against, and this nut, when turned against the end of the sleeve, becomes a lock-nut, preventing any possibility of the sleeve unscrewing.

The collar K is screwed on the outside of the sleeve, and leaves space M between that and the nut I for the carriage-top joint to work on.

I claim—

1. In a carriage-prop, the plate A, having the recesses B and D, stops F, and opening C, in combination with the post, screw-threaded and carrying the sleeve E, all substantially as and for the purposes specified.

2. The combination of the post, sleeve E, and prop-nut I, substantially as and for the purpose set forth.

ALBERT F. HALL.

Witnesses:
HORACE HARRIS,
W. E. BRADNER.